(12) United States Patent
Maris

(10) Patent No.: US 6,447,156 B2
(45) Date of Patent: Sep. 10, 2002

(54) MIXING ELEMENT FOR SCREWS AND AN EXTRUDER COMPRISING THE MIXING ELEMENT

(75) Inventor: Gianfranco Maris, Collegno (IT)

(73) Assignee: F. LLI Maris S.p.A. (IT)

( * ) Notice: Subject to any disclaimer, the term of this patent is extended or adjusted under 35 U.S.C. 154(b) by 0 days.

(21) Appl. No.: 09/815,663

(22) Filed: Mar. 23, 2001

(30) Foreign Application Priority Data

Mar. 23, 2000 (IT) .................................... TO2000A0278

(51) Int. Cl.[7] .............................. B29B 7/38; B29B 7/46; B01F 7/10
(52) U.S. Cl. ............................ 366/82; 366/85; 425/204
(58) Field of Search .............................. 366/85, 80, 81, 366/90, 96, 97, 82, 315, 297, 300, 301; 425/204

(56) References Cited

U.S. PATENT DOCUMENTS

| | | | | |
|---|---|---|---|---|
| 2,670,188 A | * | 2/1954 | Erdmenger | ................... 366/97 |
| 3,446,485 A | * | 5/1969 | Fischer | ........................ 366/301 |
| 3,608,868 A | * | 9/1971 | Koch | ............................ 366/85 |
| 4,084,263 A | * | 4/1978 | Millauer | ..................... 366/300 |
| 4,115,369 A | * | 9/1978 | Sugio et al. | ................. 366/300 |
| 4,131,371 A | * | 12/1978 | Tynan | ......................... 366/301 |
| 4,184,773 A | * | 1/1980 | Ellwood | ..................... 366/300 |
| 4,215,942 A | * | 8/1980 | Seufert et al. | ................ 366/81 |
| 4,343,929 A | * | 8/1982 | Sugio et al. | ................... 366/85 |
| 5,048,971 A | * | 9/1991 | Wall et al. | ................... 366/301 |
| 5,520,455 A | * | 5/1996 | Yamada et al. | ............. 366/300 |
| 6,116,770 A | * | 9/2000 | Kiani et al. | ................... 366/85 |
| 6,224,251 B1 | * | 5/2001 | Kuratsu et al. | ............. 366/300 |

* cited by examiner

Primary Examiner—Tony G. Soohoo
(74) Attorney, Agent, or Firm—Myers Bigel Sibley & Sajovec

(57) ABSTRACT

The mixing element has a central hole for keying to the shaft of the screw and an outer profile which can be produced as a result of the removal of material from a circular element along at least one arc of its Outer portion by cutting performed by a point-like element rotating around a circle with a diameter equal to that of the circular element. The point-like element and the circular element rotate in the same direction and at the same speed and the centers of the circular element and of the circle are spaced apart by a distance less than their diameter. During a portion of the cutting process, the distance between the centers of the circular element and of the circle is reduced so that the portion of the outer profile which is correspondingly cut is recessed.

8 Claims, 4 Drawing Sheets

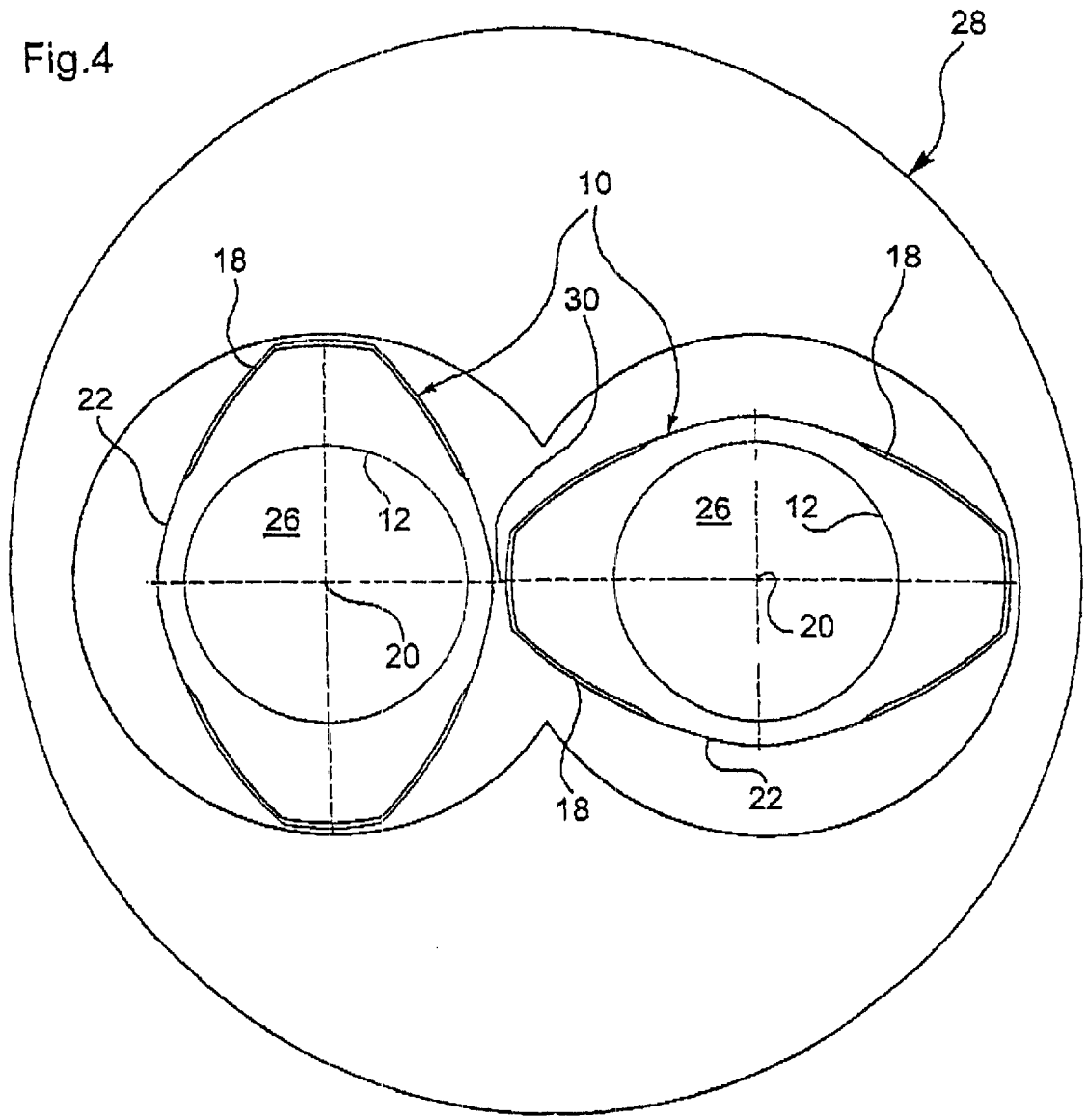

MIXING ELEMENT FOR SCREWS AND AN EXTRUDER COMPRISING THE MIXING ELEMENT

Figure 1:
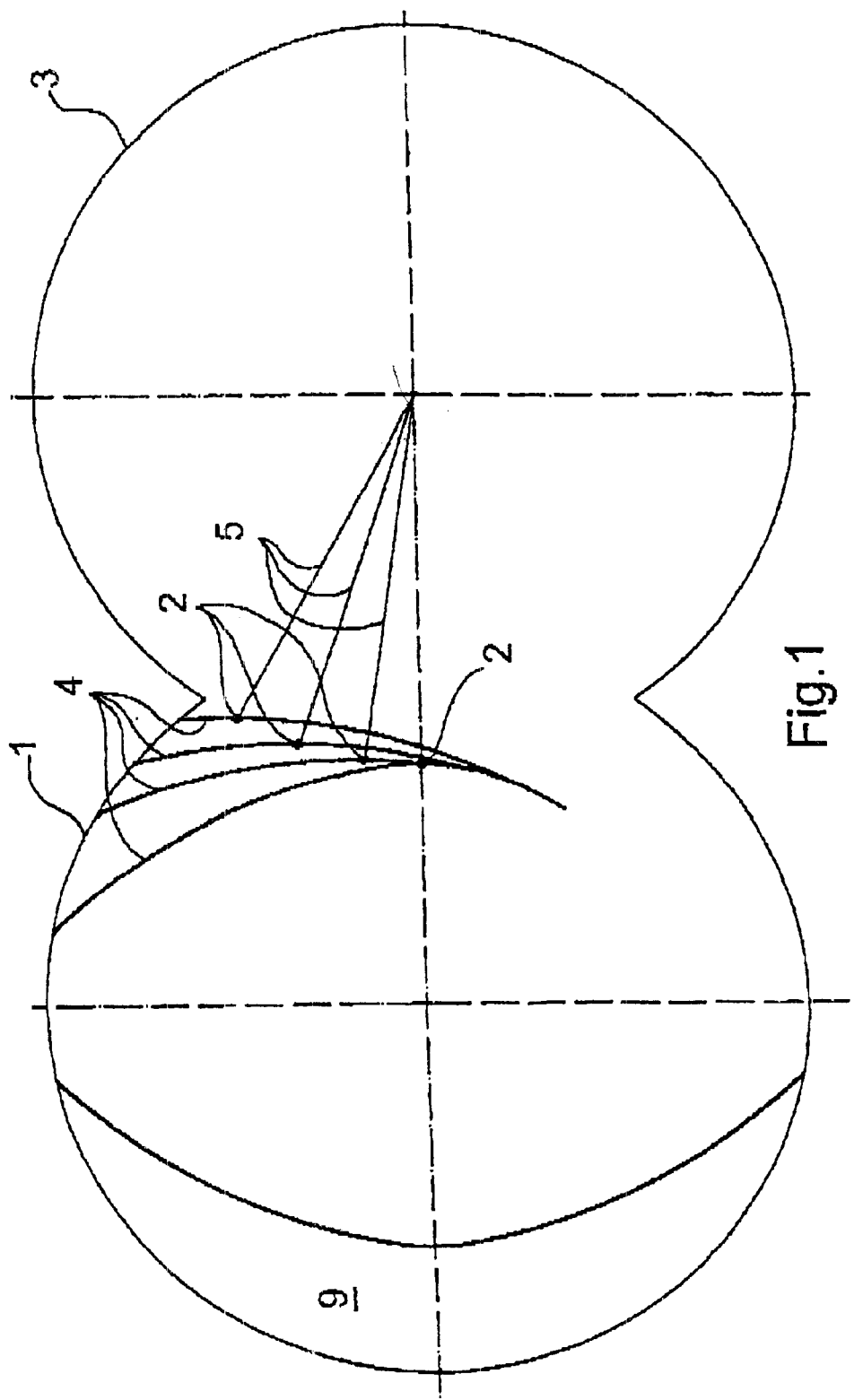

This application claims priority from G. Maris, Italian Patent Application No. TO2000A000278, filed Mar. 23, 2000, the disclosure of which is incorporated by reference herein in its entirety.

The present invention relates to a mixing element for screws of extruders with two co-rotating screws and to an extruder comprising the mixing element.

The outer profile of a conventional mixing element can be produced (FIG. 1) as a result of the removal of material from a circular element 1 along at least one arc of its outer portion, by cutting performed by a point-like element 2 rotating around a circle 3 with a diameter equal to that of the circular element 1. By way of indication, the point-like cutting element 2 may, for example, be considered as the trace in the plane of the drawing of a laser beam perpendicular thereto. During the cutting, the point-like element 2 and the circular element 1 rotate in the same direction and at the same speed and the centers of the circular element 1 and of the circle 3 are spaced apart by a constant distance less than their diameter.

The curves indicated by the reference numerals 4 in FIG. 1 represent the positions adopted successively by the circular element being cut as a result of successive rotations through 100 about its center, and the ends of the radii 5 of the circle 3 represent successive points of contact of the point-like element 2 with the circular element 1.

For reasons of practicality of implementation, the actual method of producing known mixing elements may differ from the theoretical method just described. The final result, however, is the same, that is, the removal of a certain portion of the circular element 1; for example, the removal of a crescent 9 as a result of a rotation through 90°, which results in the production of the element 6a shown in FIG. 2a.

Figure 2:
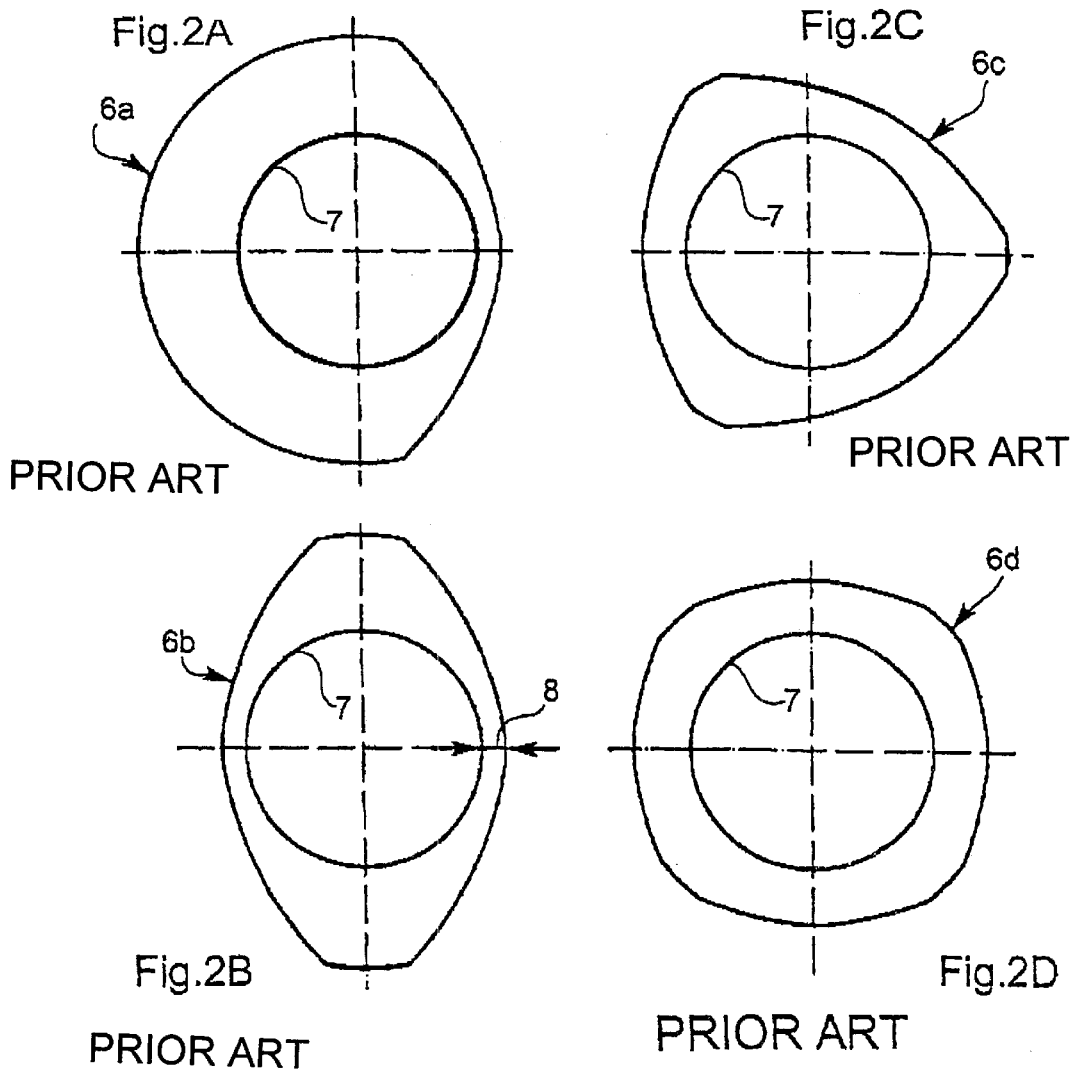

By performing the cutting operation starting from several different points, it is possible to produce mixing elements with different profiles, for example, those distinguished by the references 6b, 6c and 6d, shown in FIGS. 2b, 2c and 2d, respectively.

According to the prior art, a plurality of mixing elements 6a–6d are keyed onto the shafts of the two screws of an extruder by means of respective central toothed holes 7 and the mixing elements of each screw are intended to work in cooperation with respective homologous elements mounted facing them on the shaft of the other screw.

The screws rotate in the same direction and at the same speed. The portions of the outer profiles of the homologous mixing elements facing one another at any particular time on the straight line joining the centers of these elements therefore define a space of constant width, through which the polymeric material being processed passes and is thus subjected to a mechanical stress.

The width of the space depends both on the spacing with which the two screws are positioned and on the reduction in the extent of the mixing element, in comparison with the circular element 1 from which it has been formed.

In determining the width of this space, the need to increase it in order to avoid imparting excessively high shear forces to the material is tempered by the need to reduce it in order to confer on the mixing element a width such that it can absorb the mechanical torque transmitted to it by the motor driving the respective screw, even in the narrowest portion (see reference numeral 8 in FIG. 2b).

In the end, a compromise value, which cannot be completely satisfactory with regard to one or both of the above-mentioned requirements, is thus selected.

The object of the present invention is to provide a mixing element for extruders with two screws by virtue of which the shear force exerted on the material being processed in the extruder is reduced without thereby comprising the ability of the mixing element to absorb the torque transmitted to it.

According to the invention, this object is achieved by means of a mixing element, as well as an extruder comprising the mixing element and a processing method performed thereby, having the specific characteristics recited in the appended claims.

Figure 3:
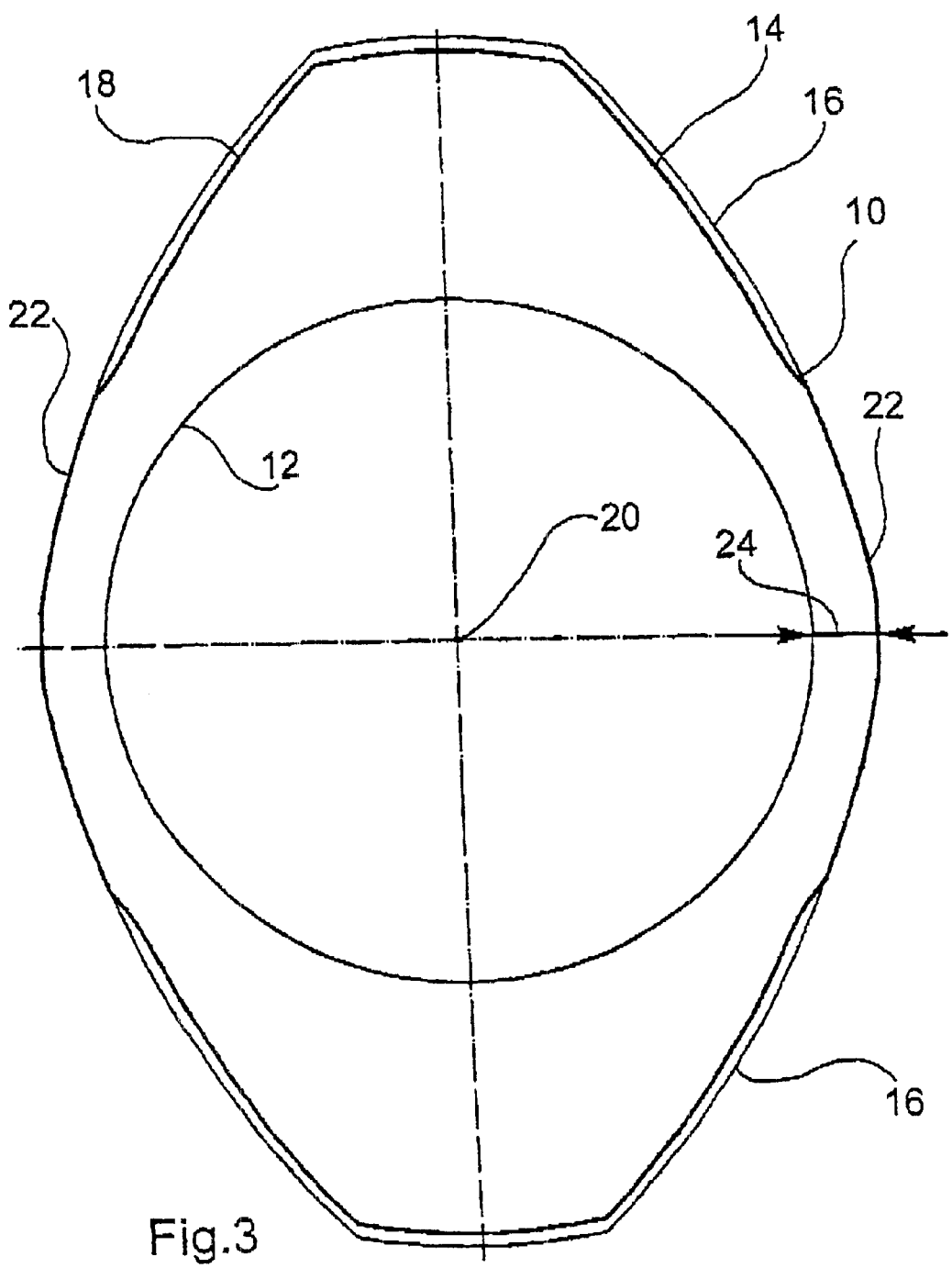

Advantages and characteristics of the present invention will become clear from the following detailed description, provided by way of non-limiting example, with reference to the appended drawings, in which:

FIG. 1 is a schematic representation of a theoretical method of producing the profile of a mixing element of the prior art, FIGS. 2a to 2d illustrate various profiles of known mixing elements, FIG. 3 shows a profile of a mixing element according to the invention, and FIG. 4 shows schematically, a section of an extruder with two screws comprising mixing elements according to the invention.

A mixing element 10 (FIG. 3) has a central hole 12 for keying to a shaft of a screw of an extruder with two co-rotating screws, and an outer profile 14 which, in comparison with that of the conventional element 6b (indicated 16 in FIG. 3), is recessed in the portions 18 disposed at a greater distance from the center 20 of the element 10.

The method of producing the element 10 differs from the theoretical method of producing the profile of the element described in the introductory part of the present description in that, during a portion of the cutting process, the distance between the centers of the circular element and of the circle along which the point-like cutting element rotates is reduced. The portions 18 of the outer profile 10 which are correspondingly cut are thus recessed.

The extent of the recessing is approximately constant at different points on the recessed portions 18, and these portions are radiused to the adjacent portions 22.

Moreover, in alternative embodiments of the invention, not shown, the extent of the recessing may vary, in principle, from point to point.

However, the recessing is advantageously not performed in the portions 22 of the outer profile 18 which are disposed at a lesser distance from the center 20 of the element 10. In fact, owing to the small thickness of material present-indicated by the reference numeral 24—they constitute the critical section for the determination of the maximum torque transmissible by the element 10. Recessing in these portions 22 also would therefore have the undesired consequence of reducing the transmissible torque.

The ratio between the maximum and the minimum distance of a point on the outer profile 14 from the center 20 of the element 10 is preferably between 1.6 and 1.4.

Mixing elements 10 of the type just described are keyed (FIG. 4) by means of the central holes 12, to the shafts 26 of the screws of an extruder 28 with two co-rotating screws and the mixing elements of each screw are intended to work in cooperation with homologous elements 10 mounted facing them on the shaft 26 of the other screw.

The space 30 between the portions of the outer profile 14 of the homologous mixing elements 10 facing one another at any particular time on the straight line joining their centres 20 is variable. In particular—for a substantial arc of rotation, by virtue of the presence of the recessed portions 18—it is greater than the constant space which would have been defined by the use of elements with conventional profiles 16.

As a result, there is a reduction in the shear stress in the larger spaces 30 without a reduction in the transmissible torque on which the degree of filling of the screws with material being processed depends. In fact, the value of this torque is determined by the narrowest portion 24 of the element 10, which remains unchanged from that of the conventional element.

These properties of the extruder 28 are particularly advantageous in the processing of heat-sensitive polymeric materials. Examples of the latter are, for example:

polyolefins containing peroxides, polyolefins containing expanding agents, unsaturated polymers containing vulcanization or cross-linking agents, polyolefins with flame-proofing fillers based on aluminium or magnesium hydroxide, and polymers which have high viscosity, in particular, greater than 5000 Pa·s, with a shear rate equal to $10\ s^{-1}$ at the process temperatures.

The extruder according to the invention can advantageously operate with a rate of rotation of the screws of less than 550 rpm and a torque density greater than 22 $Nm/cm^3$, "torque density" meaning the ratio between the torque transmitted and the interaxial spacing of the screws raised to the power of 3.

Operating with these process parameters, the extruder 28 enables the specific energy absorbed by the material being processed to be kept under control, thus preventing thermal degradation of the material due to the heat produced by internal friction as a result of the shear stresses. At the. same time, the extruder 28 ensures a good capacity for plasticization or fusion of the polymers being processed and for distributive mixing of fillers and/or additives with an adequate production volume.

Naturally, the principle of the invention remaining the same, the details of construction and forms of embodiment may be varied widely with respect to those described purely by way of example, without thereby departing from its scope. In particular, it is also possible to produce mixing elements with recessed outer profile portions corresponding to the mixing elements of conventional profile illustrated in FIGS. 2*a*, 2*c* and 2*d*.

What is claimed is:

1. A mixing element for extruders with two co-rotating screws, having a central hole for keying to the shaft of the screw and an outer profile which can be produced as a result of the removal of material from a circular element along at least one arc of its outer portion by cutting performed by a point-like element rotating around a circle with a diameter equal to that of the circular element, the point-like element and the circular element rotating in the same direction and at the same speed, and the centers of the circular element and of the circle being spaced apart by a distance less than their diameter, the mixing element being characterized in that, during at least a portion of the cutting process, the distance between the centers of the circular element and of the circle is reduced so that the portion of the outer profile which is correspondingly cut includes a substantially straight-edged recessed portion.

2. An element according to claim 1, wherein the depth of the recessing portion is constant at different points of the recessed portion.

3. An element according to claim 1, wherein the depth of the recessed portion is variable at different points of the recessed portion.

4. An element according to claim 1, wherein the recessed portion is radiused to a portion adjacent to the recessed portion.

5. An element according to claim 1, further comprising an unrecessed portion of the outer profile at a lesser distance from the center of the circular element than the recessed portion.

6. An element according to claim 1, wherein the ratio between the maximum and the minimum distance of a point on the outer profile from the center of the element is between 1.6 and 1.4.

7. An extruder with two co-rotating screws comprising a pair of screws mounted parallel to one another in a cylinder, at least one mixing element according to claim 1 being keyed to the shaft of each of the screws, the element facing a homologous element mounted on the shaft of the other screw in a manner such that the space between the portions of the outer profiles of the homologous mixing elements facing one another at any particular time on the straight line joining their centres as a result of their rotation, is variable.

8. A method of processing polymeric materials which provides for the use of an extruder according to claim 7 with a torque density greater than 22 $Nm/cm^3$ and a rate of rotation of the screws of less than 550 rpm.

* * * * *